United States Patent [19]
Yonezawa

[11] Patent Number: 5,323,241
[45] Date of Patent: Jun. 21, 1994

[54] METHOD OF AND AN APPARATUS FOR GENERATING A NORMALIZING CURVE

[75] Inventor: Yasuharu Yonezawa, Kyoto, Japan

[73] Assignee: Dainippon Screen Mfg. Co., Ltd., Japan

[21] Appl. No.: 148,672

[22] Filed: Nov. 1, 1993

[30] Foreign Application Priority Data

Oct. 30, 1992 [JP] Japan ................................. 4-315782

[51] Int. Cl.$^5$ ............................................. H04N 1/21
[52] U.S. Cl. ..................................... 358/298; 346/108
[58] Field of Search ................... 346/1.1, 108, 107 R, 346/160; 358/298, 296, 300, 302, 524, 529

[56] References Cited

U.S. PATENT DOCUMENTS 4,797,729  1/1989  Tsai ..................................... 358/138
4,970,562  11/1990 Birnbaum ............................ 355/327
5,014,328  5/1991  Rudak ................................. 358/524
5,161,010  11/1992 Birnbaum ............................ 358/529

Primary Examiner—Mark J. Reinhart
Attorney, Agent, or Firm—Ostrolenk, Faber, Gerb & Soffen

[57] ABSTRACT

A normalizing curve ($C_{rx}$) is generated by correcting a reference normalizing curve. The character of the normalized curve depends on dummy shadow and highlight points ($A_4$, $A_3$) as well as shadow and highlight points ($A_2$, $A_1$), which are determined as a function of the statistical distribution of densities on an original image. Color original image signals representative of the original image are converted through the normalizing curve to obtain converted color image signals in which a gray balance in the intermediate density region is corrected.

14 Claims, 12 Drawing Sheets

METHOD OF AND AN APPARATUS FOR GENERATING A NORMALIZING CURVE

BACKGROUND OF THE INVENTION

1. Field of the Invention

The present invention relates to a method of and an apparatus for generating a normalizing curve which is used in an image processing apparatus which processes an image such as a process scanner.

2. Description of the Prior Art

In a process color scanner and the like, after an image of a color original is subjected to color separation to thereby obtain density signals for the respective color components, the density signals are converted into half-tone dot signals with which recording of a reproduced image is performed. If there is a hue deviation in the original, color separation conditions are changed at the discretion of an operator so that the gray balance will be maintained in the reproduced image.

In a conventional method of automatically altering color separation conditions as that disclosed in U.S. Pat. No. 4,984,071 filed by the inventor of the present invention, a reference density point is determined for each color component based on density values of the brightest portion and the darkest portion of the original (i.e., highlight and shadow density values), a gradation conversion curve (i.e., normalizing curve) is established so that these density values have predetermined signal levels, and different density distributions of image data are normalized for the respective images. This makes it possible that peaks in the distributions of the density values of a bright portion and a dark portion are corrected and an image entirely having a tone of a certain color (hue deviation) is corrected.

However, in such a correction method as above (hereinafter "first conventional method"), if there is a hue deviation only in a shadow portion due to a fact that the maximum value which can be expressed by a color film, i.e., the original, is different among the respective color components, it is difficult to perform appropriate correction. That is, since the first conventional method uniformly performs correction over a wide density range, if correction to remove the hue deviation in the shadow portion is performed, a low and intermediate density region will be also corrected and the gray balance in the low and intermediate density region will be lost.

To deal with this, the inventor of the present invention has proposed a normalizing curve generation method as that disclosed in U.S. Pat. No. 5,117,293 (hereinafter "second conventional method"). In the second conventional method, in addition to the highlight and the shadow density values mentioned above, a dummy shadow density value is determined in a predetermined manner so that a normalizing curve is generated which changes along a straight line which passes through a first and a second points which are determined by said highlight density value and said shadow density value on a coordinates plane and through a third point which is determined by said first point and said dummy shadow point in the low and intermediate density region.

According to the second conventional method, by properly setting the third point (i.e., dummy shadow density value), the hue deviation near the shadow density value is corrected and a normalizing curve is changed without affected by the amount of correction made in the shadow density range in the low and intermediate density region.

Still, due to characteristics of a color film, i.e., an original, if there is differences between the respective color components in terms of a ratio of change in a density with respect to a logarithmic value of the quantity of incident light in a section from the low density range to the intermediate density range, it is impossible to appropriately correct the gray balance in the intermediate density region by the second conventional method, not to mention by the first conventional method.

In other words, since correction of the hue deviation over all density regions is performed in the first conventional method while correction only in the vicinity of the shadow density value is performed in the second conventional method, it is impossible in both the first and the second conventional methods to perform appropriate correction of the gray balance only in the intermediate density region, or in the intermediate density region and in the vicinity of the shadow density value, or in the intermediate density region and in the vicinity of the highlight density value.

An object of the present invention is to solve such a problem and to offer a normalizing curve generation method which makes it possible to perform correction of the gray balance in an intermediate density region which has been heretofore impossible.

SUMMARY OF THE INVENTION

The present invention is directed to a method of converting original color image signals $D_x$ into converted color image signals $D_{Nx}$ suitable for image processing in a color image processor. The original color image signals $D_x$ represent optical densities of an original color image for each pixel and for respective color components.

According to the present invention, the method comprises the steps of: (a) specifying gray pixels on the original color image; (b) averaging the original color image signals $D_x$ for respective color components in each gray pixel to obtain an average signal $D_M$ for each gray pixel; (c) dividing a range of the average signal $D_M$ into a plurality of classes $D_{Mi}$; (d) classifying the average signal $D_M$ representative of the gray pixels into the plurality of classes $D_{Mi}$; (e) accumulating the original color signals $D_x$ for each color component in each class $D_{Mi}$ of the average signal $D_M$ to obtain accumulated density signal $\Sigma D_x$ for each color component; (f) generating a sum signal $\Sigma(\Sigma D_x)_M$ representative of a sum of the accumulated density signal $\Sigma D_x$ for each color component within a predetermined intermediate density section $D_{Mk} \leq D_M \leq D_{Mh}$; (g) counting number $\Sigma N_{pn}$ of pixels whose original color signals $D_x$ are included in the intermediate density section $D_{Mk} \leq D_M \leq D_{Mh}$; (h) dividing the sum signal $\Sigma(\Sigma D_x)_M$ for each color component by the number $\Sigma N_{pn}$ of pixels to obtain accumulated average signals $M_{dx}$ for respective color components; (i) averaging the accumulated average signals $M_{dx}$ for respective color components to obtain a gray average signal $M_{da}$; (j) generating difference signals $M_{Dx}=(M_{dx}-M_{da})$ between the accumulated average signals $M_{dx}$ and the gray average signal $M_{da}$; (k) modifying a predetermined reference signal-conversion characteristic C as a function of the difference signals $M_{Dx}=(M_{dx}-M_{da})$ to obtain modified signal-conversion characteristics $C_{rx}$ for respective color components; and (l) converting the original color image signals $D_x$ by the modified signal-conversion characteristics $C_{rx}$ to obtain the converted color image signals $D_{Nx}$ for respective color components.

The difference signals $M_{Dx}=(M_{dx}-M_{da})$ well represent relative deviations of respective color components in the intermediate density section, and therefore, the gray balance in the intermediate density section is attained by using the modified signal-conversion characteristics $C_{rx}$ which are obtained as a function of the difference signals $M_{Dx}=(M_{dx}-M_{da})$.

In an aspect of the present invention, signal-conversion characteristic for converting original color image signals $D_x$ are obtained by the steps of: (a) determining a highlight density $D_{Hx}$ and a shadow density $D_{Sx}$ in a possible density range of the original color image signals $D_x$; (b) determining dummy highlight densities $C_{DHx}$ and dummy shadow densities $C_{DSx}$ for respective color components in the possible density range of the original color image signals $D_x$; and (c) determining signal-conversion characteristics $C_{rx}$ for respective color components representative of signal-conversion curves defined on a coordinate plane satisfying the conditions that; I) the signal-conversion curves pass through; first points $(D_{Hx}, p_x)$ defined by the highlight densities $D_{Hx}$ and first predetermined signal values $p_x$, and second points $(D_{Sx}, q_x)$ defined by the shadow densities $D_{Sx}$ and second predetermined signal values $q_x$, and II) part of the signal-conversion curves defined for a predetermined intermediate density section coincide with or approximate to lines connecting; third points $(C_{DHx}, p_x)$ defined by the dummy highlight densities $C_{DHx}$ and the first predetermined signal values $p_x$, and fourth points $(C_{DSx}, q_x)$ defined by the dummy shadow densities $C_{SHx}$ and the second predetermined signal values $q_x$.

The first and second points are effective for determining the feature of the signal-conversion curves in highlight and shadow sections, while the third and fourth points are effective for determining the feature of the signal-conversion curves in the intermediate density section.

Accordingly, an object of the present invention is to ensure the gray balance in an intermediate density region on a color image.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Overall Structure and General Operation of Embodiment

Figure 1:
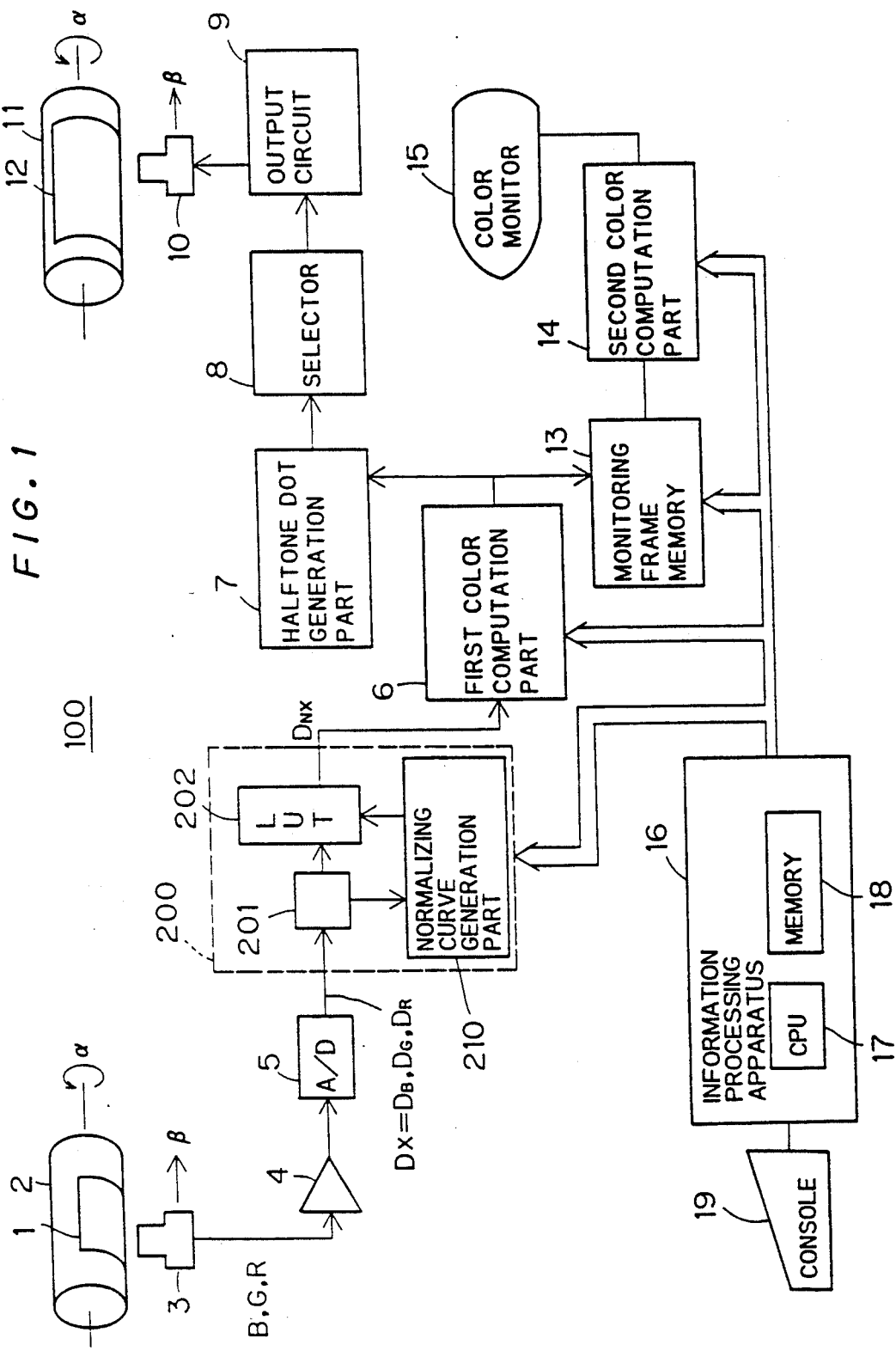
FIG. 1 is a block diagram showing an overall structure of a process color scanner to which an embodiment of the present invention is applicable.

FIG. 1 is a block diagram showing an overall structure of a process color scanner 100 to which an embodiment of the present invention is applicable.

A color original film 1 is wound around an original drum 2. In a faced relation to the original drum 2, a pick-up head 3 is disposed. By translation of the original drum 2 in a direction $\alpha$ (i.e., main scanning direction) and translation of the pick-up head 3 in a direction $\beta$ (i.e., subscanning direction), the original film is scanned in both the main scanning direction and the subscanning direction, whereby the image of the original film 1 is photoelectrically read pixel by pixel in the order of scanning lines by the pick-up head 3.

The image information about the original film 1 is logarithmically converted by a logarithm convertor 4 for each one of the color components blue (B), green (G) and red (R) and then converted by an A/D conversion circuit 5 into digital density signals $D_B$, $D_G$ and $D_R$ for the respective color components B, G and R.

The respective density signals $D_x$ thus created in correspondence with the respective pixels (x=B, G, R; In the description hereinafter, the symbol "x" is used to indicate x=B, G, R. The symbol "x" will not be therefore described again) are supplied to a normalizing conversion part 200.

The normalizing conversion part 200 is comprised of a dividing circuit 201, a normalizing curve generation part 210 and a look up table (LUT) 202. During prescanning, the dividing circuit 201 is connected to the normalizing curve generation part 210 side as well, and the normalizing curve generation part 210 generates a reference normalizing curve by a method which will be described later based on the inputted density values (i.e., density signals $D_x$) and appearance frequencies of the respective pixels. Information about the reference normalizing curve is loaded in the LUT 202 for each color component as numeric data.

During scanning, the dividing circuit 201 is disconnected from the normalizing curve generation part 210 side and connected to the LUT 202 side. The density signals $D_x$ of the respective pixels that were read are normalized based on the data which are stored in the LUT 202 so as to be changed to normalized density signals $D_{Nx}$ which will be given to a next stage element, i.e., a first color computation part 6.

The first color computation part 6 performs color computation based on the normalized density signals $D_{Nx}$ to thereby generate color separation signals Y, M, C and K. These color separation signals are converted into halftone dot signals Y, M, C and K in a halftone dot generation part 7. The halftone dot signals are combined in a time sharing manner by a selector 8 and provided to an output circuit 9.

A recording head 10 is equipped with a laser light source so as to ON/OFF modulate a laser beam in accordance with a modulation signal which is received from the output circuit 9. A photosensitive film 12 is wound around a recording drum 11. By combination of translation of the drum 11 in the direction α (i.e., main scanning direction) and translation of the recording head 10 in the direction β (i.e., subscanning direction), the photosensitive film 12 is exposed by the laser beam pixel in the order of the scanning lines.

On the other hand, independently of prescanning and scanning, the color separation signals Y, M, C and K outputted from the first color computation part 6 are stored for each pixel in a monitoring frame memory 13 and converted again into color signals B, G and R in a second color computation part 14 before displayed at a color monitor 15. Thus, the operator can manipulate image processing performed at the normalizing conversion part 200 and the first color computation part 6 while monitoring the processing.

An information processing apparatus 16 comprises a CPU 17 and a memory 18 for storing a system program and controls operations of the normalizing conversion part 200, the first color computation part 6, the monitoring frame memory 13 and the second color computation part 14. A console 19 is provided to manually input various commands and data into the information processing apparatus 16.

In the following, description will be given on a case where the color separation images Y, M, C and K are recorded positive on the photosensitive film 12.

B. Structure and Operation of Normalizing Curve Generation Part

Figure 2:
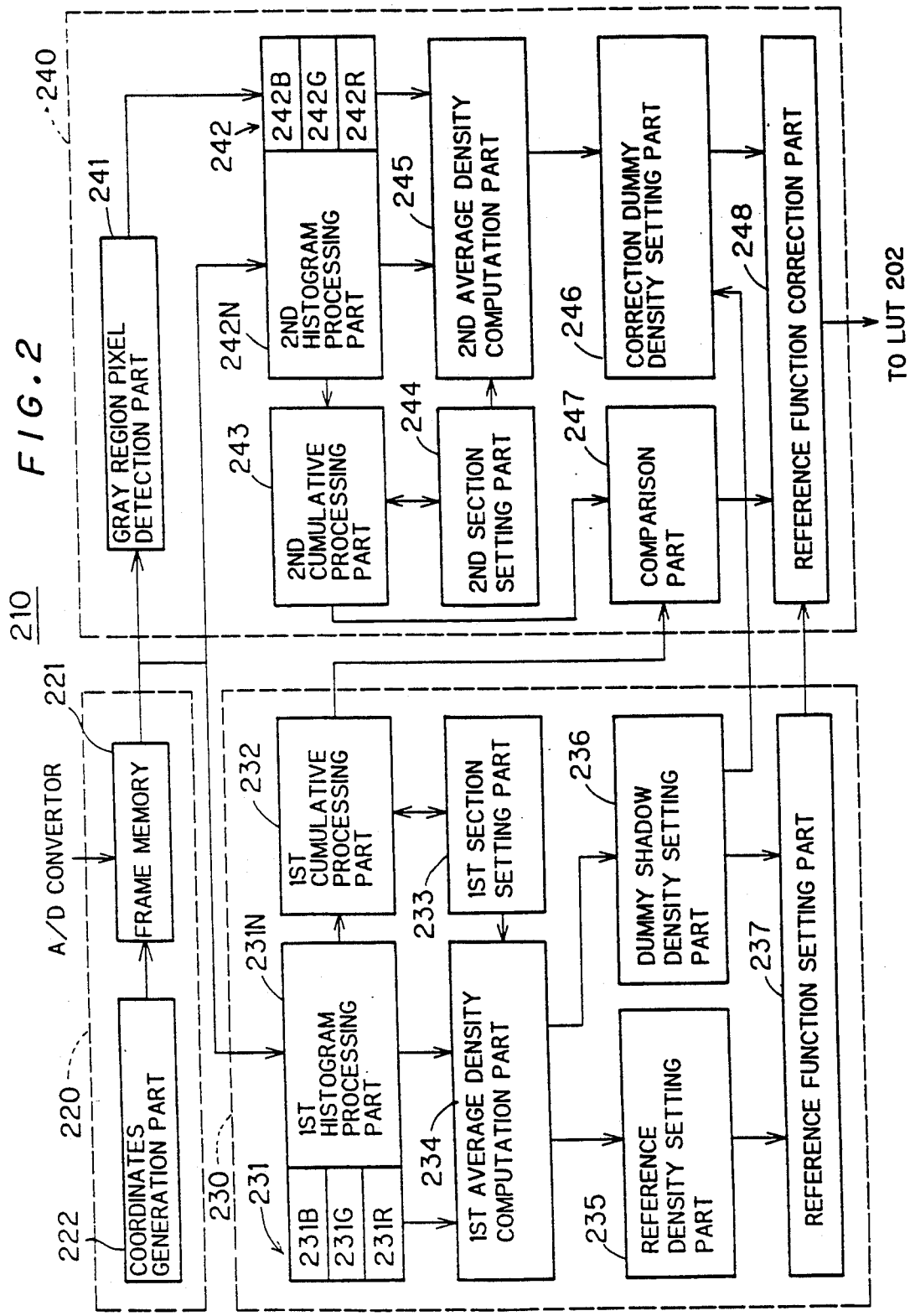
FIG. 2 is a block diagram showing the structure of a normalizing curve generation part of the embodiment of FIG. 1.

FIG. 2 is a block diagram showing an embodiment of the structure of the normalizing curve generation part 210 of the normalizing conversion part 200 (FIG. 1). The normalizing curve generation part 210 is essentially comprised of an input part 220, a reference normalizing curve setting part 230 and an intermediate density region correction part 240. The detailed structure of these parts will be described later with reference to FIGS. 3, 4 and 5 each showing a flow chart explaining generation of a normalizing curve.

In the present embodiment, a reference normalizing curve which is created by the second conventional method described in U.S. Pat. No. 5,117,293 is used. The reference normalizing curve is determined as a function of highlight and shadow density values and a dummy shadow density value for appropriately correcting the hue deviation in the vicinity of the shadow density value. In low and intermediate density regions, the reference normalizing curve is free from influence of the amount of the hue deviation in the shadow density range. In the present embodiment, the reference normalizing curve is corrected appropriately to obtain a new normalizing curve in order to correct the gray balance in the intermediate density region which may be lost due to characteristics of a color original film. The details of the gray balance correction will be described later.

B-1. Generation Method of Reference Normalizing Curve

Figure 3:
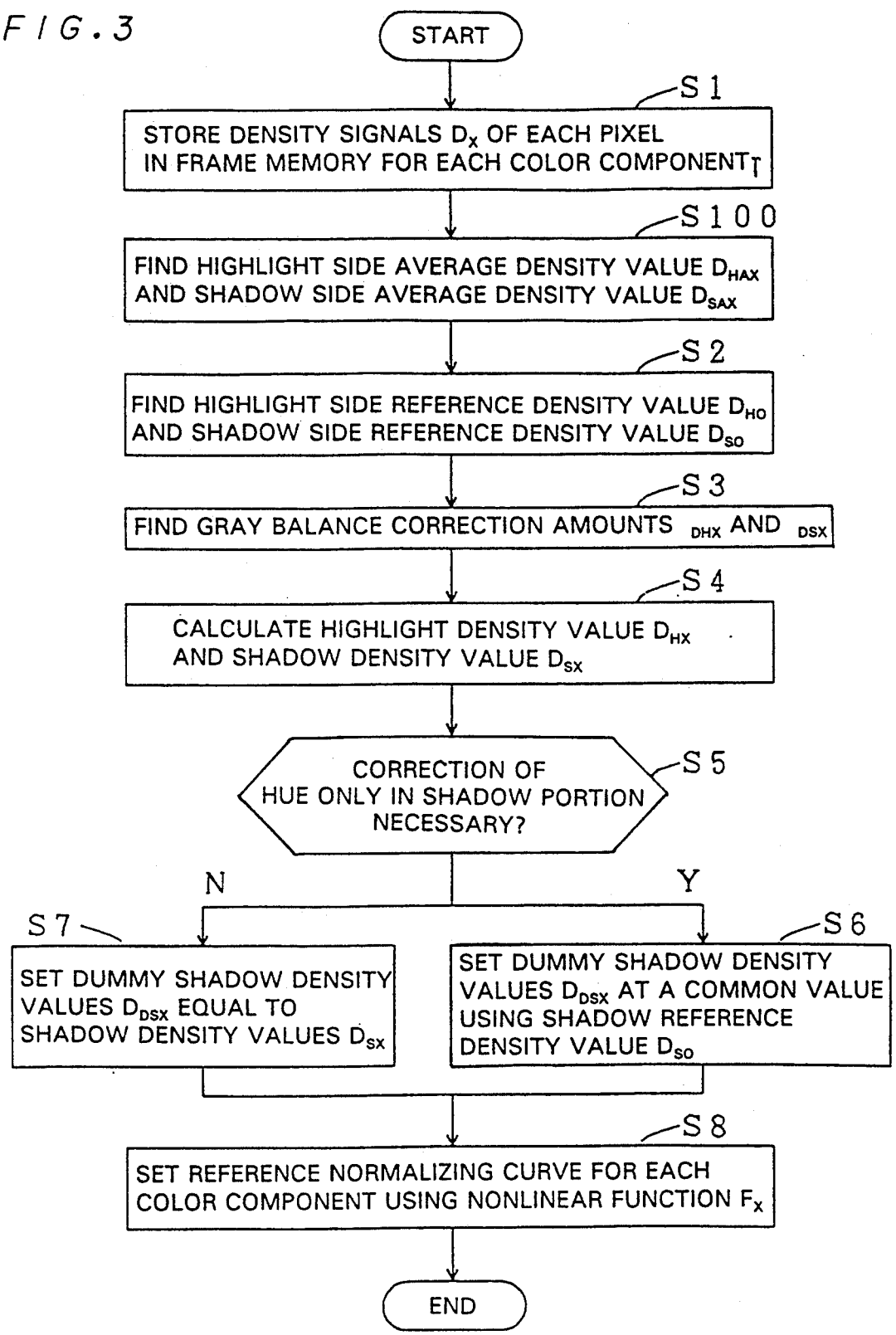
FIG. 3 is a flow chart showing operations of a reference normalizing curve setting part of the normalizing curve generation part of FIG. 2.
Figure 4:
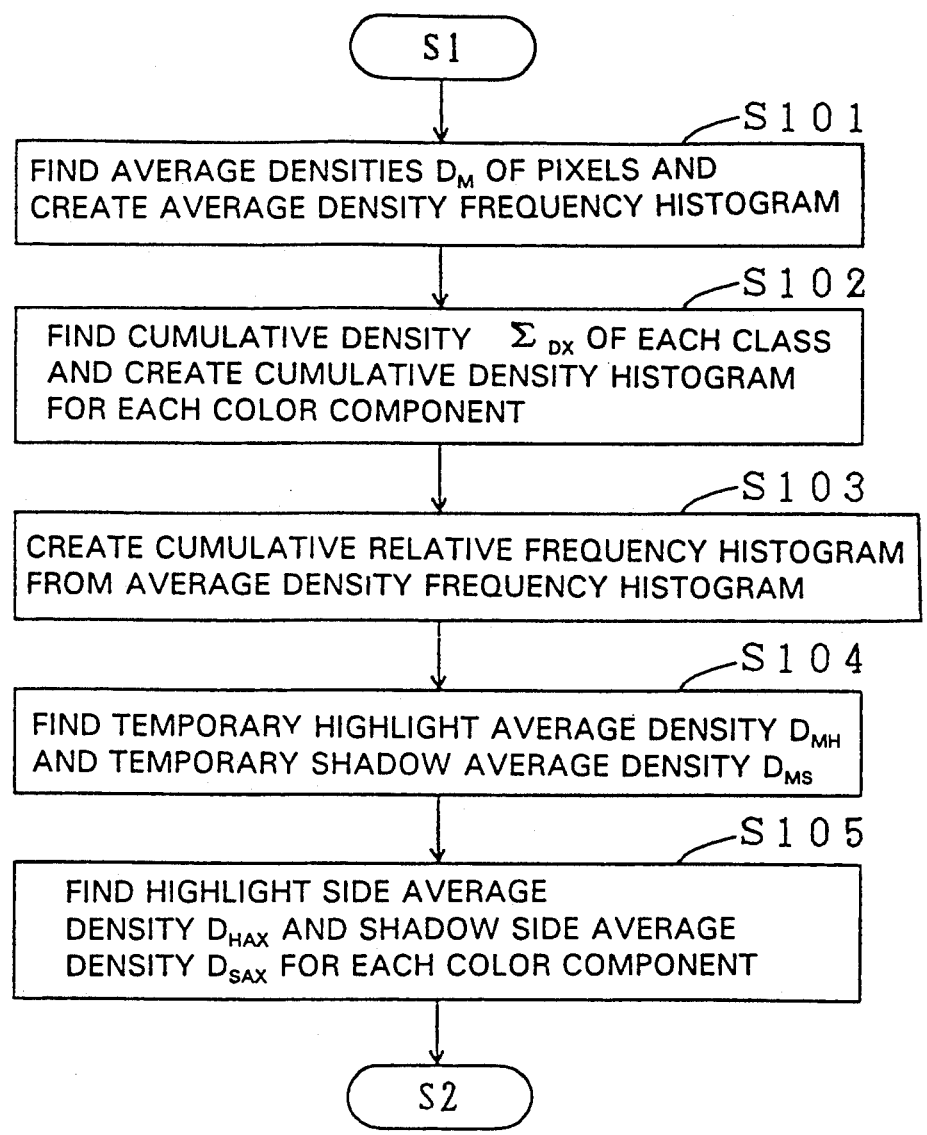
FIG. 4 is a flow chart for explaining procedures of data processing at a step S100 of FIG. 3.

FIGS. 3 and 4 are flow charts showing how the normalizing curve generation part 210 of FIG. 2 establishes a reference normalizing curve. In the following, successive stages of establishing process of a reference normalizing curve will be described with reference to these flow charts.

B-1-1. Calculation of Average Density Value

The image signals which are created by prescanning of the original film 1 are converted into the digital density signals $D_x$ by the logarithm convertor 4 and the A/D conversion circuit 5 (FIG. 1) as described earlier. Following this, through the dividing circuit 201, the density signals $D_x$ of the respective pixels are stored for each one of the color components B, G and R in the frame memory 221 (FIG. 2) of the input part 220 which is disposed in the normalizing curve generation part 210 (Step S1 of FIG. 3).

If the original film 1 is a large size film, the density signals $D_x$ are stored in the frame memory 221 while subtracting the pixels.

During reading of the density signals $D_x$ which are stored in the frame memory 221 by a next stage element, i.e., the reference normalizing curve setting part 230 or the intermediate density region correction part 240, a coordinates value of a predetermined image portion is generated by a coordinates generation part 222, whereby an image within a predetermined range is designated as an image-to-be-processed and the density signals $D_x$ of corresponding pixels are sent to the next stage element for each pixel.

A next step S100 is a sub routine for finding a highlight side average density value $D_{HAx}$ and a shadow side average density value $D_{SAx}$ from these density signals $D_x$. FIG. 4 is a flow chart showing the details of the step S100.

Figure 6:
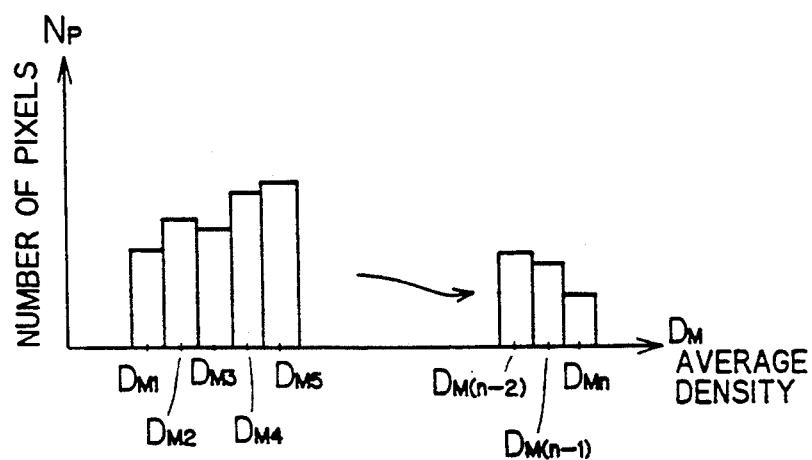
FIG. 6 is a view showing an example of an average density frequency histogram.

At a step S101, based on the density signals $D_x$, for each pixel given from the input part 220, an average density value $D_M$ ($D_M=(D_B+D_G+D_R)/3$) is calculated by a first histogram processing part 231 (FIG. 2). This calculation is performed on all pixels which are sent from the input part 220. An average density frequency histogram generation part 231N generates an average density frequency histogram of each color component in which the range of the average density value $D_M$ is measured along a horizontal axis and the number of pixels NP is measured along a vertical axis. FIG. 6 shows an example of an average density frequency histogram. In FIG. 6, a class mean value (i.e., class value) is shown as $D_{Mi}$ (i=1 to n).

Figure 7:
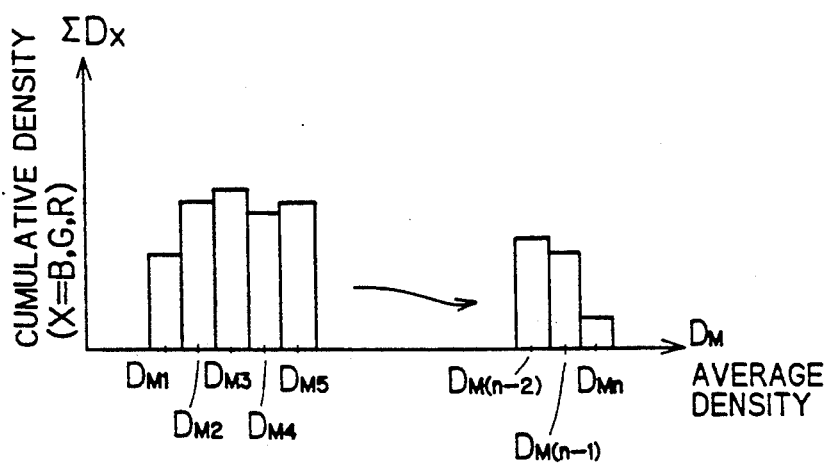
FIG. 7 is a view showing an example of a cumulative density histogram.

At a step S102, cumulative density histogram generation parts 231B, 231G and 231R which are disposed in correspondence with the respective color components accumulates the density signals $D_x$ of the respective pixels in each class of the respective average density frequency histograms of the respective color components B, G and R. After this computation is performed, cumulative density histograms for the respective color components are generated in each of which the class value $D_{Mi}$ (i=1 to n) is measured along a horizontal axis and a cumulative density value $\Sigma_{Dx}$ which corresponds to the pixels which are included in each class is measured along a vertical axis. FIG. 7 shows an example of the cumulative density histograms. For each color component x=B, G, R, such a cumulative density histogram is generated.

In reality, the steps S101 and S102 are performed simultaneously.

Figure 8:
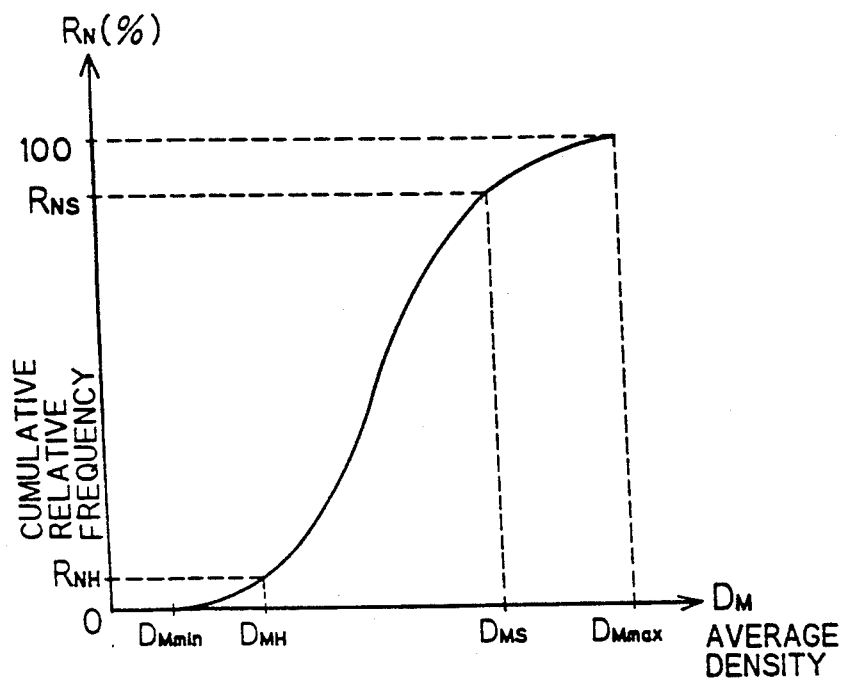
FIG. 8 is a view showing an example of a cumulative relative frequency histogram.

Next, at a step S103, based on the average density frequency histogram shown in FIG. 6, a first cumulative processing part 232 generates a cumulative relative frequency histogram as that shown in FIG. 8 in which the class value $D_{Mi}$ (i=1 to n) is measured along a horizontal axis and a relative frequency RN (%) of the pixels accumulated from a lower density side is measured along a vertical axis. The cumulative relative frequency histogram varies from 0% to 100% in the range between the minimum generated density $D_{Mmin}$ and the maximum generated density $D_{Mmax}$. It is to be noted that the cumulative relative frequency histogram of FIG. 8 approximates a curve on a premise that the width of each class is sufficiently narrow.

In a first section setting part 233 shown in FIG. 2, predetermined cumulative density appearance rates $R_{Nh}$ and $R_{NS}$ are registered. Based on these cumulative density appearance rates $R_{Nh}$ and $R_{NS}$, from the cumulative relative frequency histogram of FIG. 8, temporary highlight average density value $D_{MH}$ and a temporary shadow average density value $D_{MS}$ are respectively calculated (Step S104). Based on the temporary highlight average density value $D_{MH}$ and the temporary shadow average density value $D_{MS}$, information about a highlight side density section and a shadow side density section whose average density values are to be calculated is created and given to a first average density computation part 234.

The cumulative density appearance rates $R_{Nh}$ and $R_{NS}$ are found in advance by analysis of a number of sample originals as values from which an optimum highlight point and an optimum shadow point are statistically determined. For instance, the cumulative density appearance rates $R_{Nh}$ and $R_{NS}$ are around 1% and 98%, respectively.

The first average density computation part 234 calculates a highlight side average density value $D_{HAx}$ and a shadow side average density value $D_{SAx}$ for the respective color components of a density section which is designated by the first section setting part 233 (Step S105).

That is, in the cumulative density histogram of each color component shown in FIG. 7, as indicated at slashed portions, with respect to the highlight side, the cumulative density values $\Sigma_{Dx}$ of the pixels included in the density section equal to or smaller than the temporary highlight average density value $D_{MH}$ ($D_{Mmin} \leq D_M \leq D_{MH}$) are averaged. With respect to the shadow side, the cumulative density values $\Sigma_{Dx}$ of the pixels included in the density section equal to or larger than the temporary shadow average density value $D_{MS}$ (($D_{MS} \leq D_M \leq D_{Mmax}$) are averaged.

Assume that the total number of the pixels which belong to the highlight side density section above is $\Sigma_{NPH}$, the total of the cumulative density values within the same highlight side density section is $\Sigma(\Sigma_{Dx})H$, the total number of the pixels which belong to the shadow side density section above for the respective color components is $\Sigma_{NPS}$ and total of the cumulative density values within the same shadow side density section for the respective color components is $\Sigma(\Sigma_{DX})S$, the highlight side average density value $D_{HAx}$ and the shadow side average density value $D_{SAx}$ are defined by Eq. 1 and Eq. 2 below, respectively.

$$D_{HAx}=\Sigma(\Sigma_{Dx})H/\Sigma_{NPH} \quad (1)$$

$$D_{SAx}=\Sigma(\Sigma_{Dx})S/\Sigma_{NPS} \quad (2)$$

Figure 9:
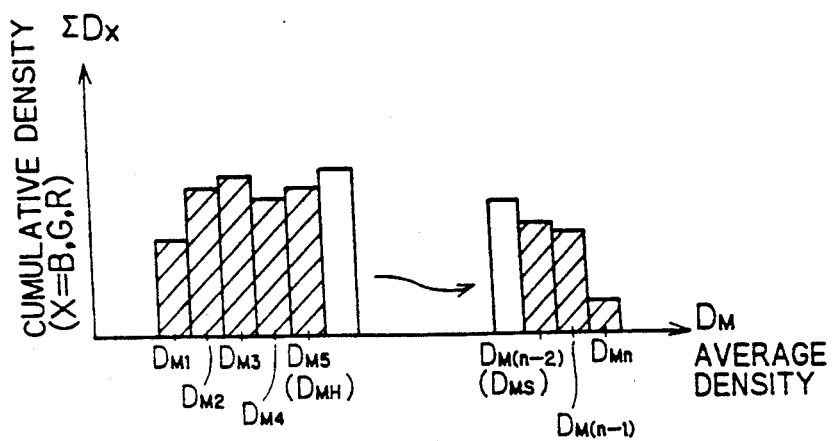
Fig. 9 is an explanatory diagram for finding average density values in a highlight side density section and a shadow side density section.

For example, when x is B in FIG. 9 and the temporary highlight density value $D_{MH}$ is $D_{M5}$, from Eq. 1, $$D_{HAB}=(\Sigma_{DM1}+\Sigma_{DM2}+\Sigma_{DM3}+\Sigma_{DM5})/(NP1+NP2+NP3+NP4+NP5)$$

where $N_{Pi}$ (i=1 to 5) is the number of the pixels whose average density values $D_M$ belong to the class $D_{Mi}$. The value $N_{Pi}$ is easily found from the average density frequency histogram of FIG. 6.

This completes the sub routine of the step S100. Following this, the sequence returns to the main routine shown in FIG. 3.

B-1-2. Determination of Highlight Reference Value and Shadow Reference Value

Based on the highlight side average density value $D_{HAx}$ and the shadow side average density value $D_{SAx}$ above, a reference density value which is commonly applied to the respective color components (i.e., a highlight reference density value $D_{HO}$ and a shadow reference density value $D_{SO}$) is calculated by a reference density value setting part 235 (Step S2).

Where a standard highlight density value and a standard shadow density value which are preliminarily determined are $D_{HF}$ and $D_{SF}$, respectively, the highlight reference density value $D_{HO}$ is obtained as a predetermined weighted mean value of the minimum value of the highlight side average density value $D_{HAx}$ and the standard highlight density value $D_{HF}$, whereas the shadow reference density value $D_{SO}$ is obtained as a predetermined weighted mean value of the maximum value of the shadow side average density value $D_{SAx}$ and the standard shadow density value $D_{SF}$.

Alternatively, the highlight reference density value $D_{HO}$ and the shadow reference density value $D_{SO}$ may be replaced by an average value of the highlight side average density values $D_{HAx}$ of the respective color components and an average value of the shadow side average density values $D_{SAx}$ of the respective color components, respectively.

B-1-3. Calculation of Gray Balance Correction Amount

Next, a gray balance correction amount $\Delta_{DHx}$ of a highlight portion and a gray balance correction amount $\Delta_{DSx}$ of a shadow portion are calculated by the following Eqs. 3 and 4 (Step S3).

$$\Delta_{DHx}=K_H \cdot GH (D_{HAx}-D_{HO}) \quad (3)$$

$$\Delta_{DSx}=K_S \cdot GS (D_{SAx}-D_{SO}) \quad (4)$$

The values $K_H$ and $K_S$ are positive constants which are experimentally determined in advance, and the functions GH and GS are defined as, for example:

$$GH (D_{HAx}-D_{HO})=(D_{HAx}-D_{HO})/[1+\{(D_{Hmax}-D_{Hmin})/A_H\}^m] \quad (5)$$

$$GS (D_{SAx}-D_{SO})=D_{SAx}-D_{SO} \quad (6)$$

where $D_{Hmax}=$ MAX ($D_{HAB}, D_{HAG}, D_{HAR}$)

$D_{Hmin} = MIN (D_{HAB}, D_{HAG}, D_{HAR})$ $A_H$: preliminarily selected positive constance m: preliminarily selected positive constance (for instance, "3")

As can be understood from Eqs. 3 to 6, the correction amount $\Delta_{DHx}$ of the highlight portion is in proportion to $(D_{HAx} - D_{HO})$ while the correction amount $\Delta_{DSx}$ of the shadow portion is in proportion to $(D_{SAx} - D_{SO})$. The value $(D_{HAx} - D_{HO})$ reflects the amount of the hue deviation in the highlight portion while the value $(D_{SAx} - D_{SO})$ reflects the amount of the hue deviation in the shadow portion.

B-1-4. Determination of Highlight Density Value and Shadow Density Value

At a next step S4, using the reference density values $D_{HO}$ and $D_{SO}$ and the correction amounts $\Delta_{DHx}$ and $\Delta_{DSx}$, a highlight density value $D_{Hx}$ and a shadow density value $D_{Sx}$ for each color component are calculated by Eqs. 7 and 8 below.

$$D_{Hx} = D_{HO} + \Delta_{DHx} \quad (7)$$

$$D_{Sx} = D_{SO} + \Delta_{DSx} \quad (8)$$

B-1-5. Determination of Dummy Shadow Density

At a step S5 that follows, the operator judges the necessity of correction of the hue deviation only in the shadow portion of the original film 1.

If correction of the hue deviation only in the shadow portion is necessary, a dummy shadow density value setting part 236 sets dummy shadow density values $D_{DSx}$ for the respective color components at a common value using the shadow reference density value $D_{SO}$ (Step S6). That is, $D_{DSB} = D_{DSG} = D_{DSR} = D_{SO}$.

On the other hand, if the original 1 is entirely faded, the dummy shadow density value setting part 236 determines the dummy shadow density values $D_{DSx}$ as the shadow density values $D_{Sx}$ of the corresponding color components (Step S7). In short, $D_{DS} = D_{Sx}$. At the step S7, the dummy shadow density value $D_{DSx}$ may not be set exactly equal to the shadow density value $D_{Sx}$. Instead, the dummy shadow density value $D_{DSx}$ may be set close to the shadow density value $D_{Sx}$.

B-1-6. Determination of Reference Normalizing Curve

A reference function setting part 237 specifies a reference normalizing curve for each color component using a predetermined nonlinear function $F_x$ based on the highlight density value $D_{Hx}$, the shadow density value $D_{Sx}$ and the dummy shadow density value $D_{DSx}$ (Step S8).

As an example of the function $F_x$ which shows such a reference normalizing curve, nonlinear functions $F_x$ as those defined by the following Eqs. 9 to 11 are determined beforehand, and information expressing these functions is stored in an inner memory of the reference function setting part 237.

$$D_N = F_x(D: u, v, w) \quad (9)$$
$$= p + (p - q) \text{og} 10[g1 + g2]$$

$$g1 = 10^{-(D-u)(v-u)} \quad (10)$$

$$g2 = 0.1 - 10^{-(w-u)(v-u)} \quad (11)$$

where p, q: constants set in the vicinity of the upper and lower limits of a normalizing density range before color computation in the first color computation part 6

Figure 10:
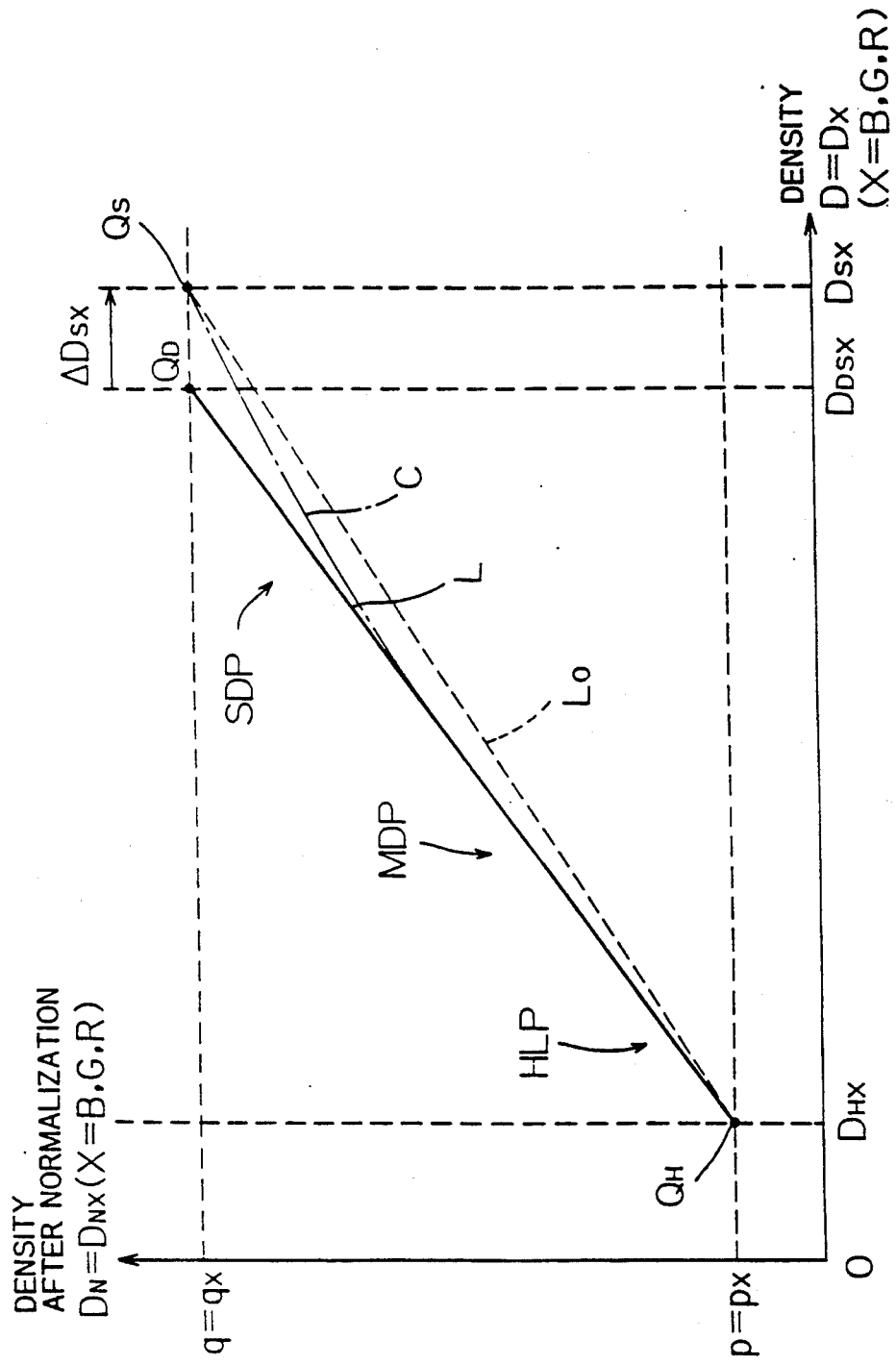
FIG. 10 is a graph showing an example of a reference normalizing curve.

D: density value before normalization $D_N$: density value after normalization $u = D_{Hx}$ $v = D_{DSx}$ $w = D_{Sx}$ FIG. 10 is a view in which the configuration of a reference normalizing curve C which is specified by the nonlinear function $F_x$ above is shown on a normalizing coordinates plane of density values. FIG. 10 concerns where the correction amount $\Delta_{DSx}$ of the shadow portion has a positive value in Eq. 8. In the coordinates plane, a density value before normalizing $D_x$ is measured along a horizontal axis while a density value after normalizing $D_N$ is measured along a vertical axis. The symbols $p_x$ and $q_x$ respectively denote the values of the constants p and q with respect to a color component x.

As shown in FIG. 10, the function $F_x$ (and hence the normalizing curve C which is generated by the same) has the following natures (i) to (iv):

(i) The reference normalizing curve C substantially passes through a point QH which is located at two-dimensional coordinates $(D_{Hx}, p_x)$;

(ii) The reference normalizing curve C passes through a point QS which is located at two-dimensional coordinates $(D_{Sx}, q_x)$;

(iii) The reference normalizing curve C changes along a straight line L in a highlight portion HLP but is off the straight line L in a shadow portion SDP. The reference normalizing curve C deviates from the straight line L largely as the density value $D_x$ becomes large. The straight line L is a line from a point QD which is located at two-dimensional coordinates $(D_{DSx}, q_x)$ and the point QH which is mentioned above.

Since the amount of deviation in the shadow portion SDP is determined in accordance with the amount of the hue deviation only in the shadow portion of the original film 1, using the reference normalizing curve of this embodiment shown as the curve C in FIG. 10, it is possible to remove the hue deviation only in the shadow portion without degrading the gray balance in the low and intermediate density region.

(iv) If a problem with the original film 1 is not just a hue deviation only in the shadow portion but fading of colors over the entire portion of the original film 1, the shadow density value $D_{Sx}$ and the dummy shadow density value $D_{DSx}$ are set equal to each other. A normalizing curve in such a case is a straight line L0 which passes through the points QH and QS.

Normalizing characteristics expressed by the straight line L0 are capable of suppressing the density of a specific color component in both an intermediate density range MDP and the shadow portion SDP, maintaining the gray balance among the respective color components, and correcting the fading over the entire portion of the original film 1.

Hence, the nonlinear function $F_x$ used in this embodiment is a function which is effective in correcting both a hue deviation only in the shadow portion and color fading over the entire portion of the original film 1. Thus, the nonlinear function $F_x$ can be used for these various types of correction.

B-2. Intermediate Density Region Correction Method

Figure 5:
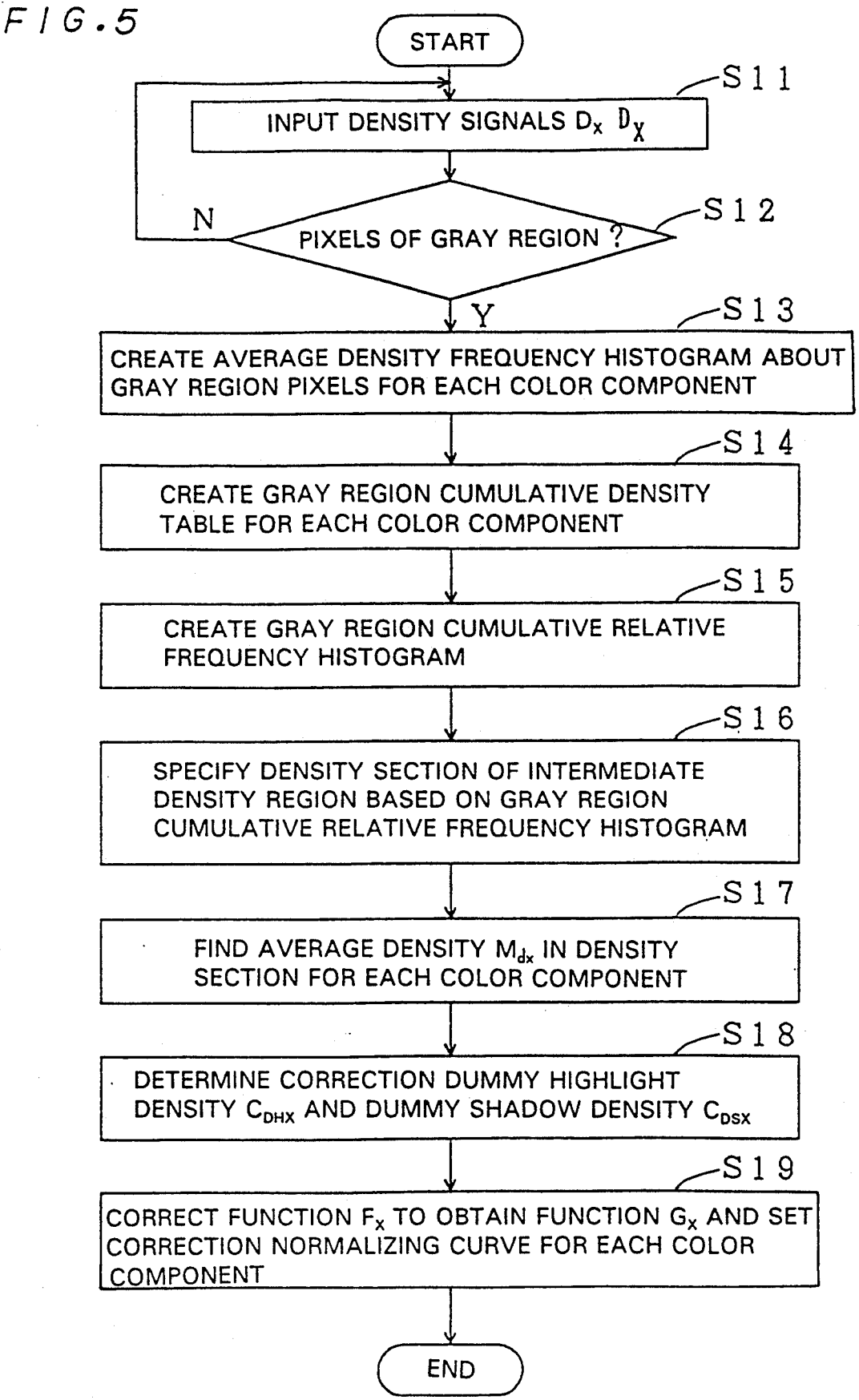
FIG. 5 is a flow chart showing operations of an intermediate density region correction part of the normalizing curve generation part of FIG. 2.

Next, correction using the reference normalizing curve C performed at the intermediate density region correction part 240 of FIG. 2 will be described with reference to the flow chart of FIG. 5.

The reference normalizing curve C established at the reference normalizing curve setting part 230 in the manner above has excellent characteristics that it is possible to correct a hue deviation only in the shadow portion or in the entire film while ensuring the gray balance by appropriately setting the dummy shadow density value $D_{DSx}$. However, due to an inherent nature of a color film, when a ratio of change of the density with respect to a logarithmic value of the amount of incident light in a section from the low density range to the intermediate density range is different between the color components, the gray balance in the intermediate density region cannot be properly corrected.

To correct the gray balance in the intermediate density region, in the manner described below, the nonlinear function $F_x$ expressing the reference normalizing curve C is corrected.

B-2-1. Detection of Gray Region Pixels

The density signals $D_x$ with respect to each pixel are inputted from the input part 220 to the intermediate density region correction part 240 (Step S11). A gray region pixel detection part 241 then judges whether the density signals $D_x$ of each pixel are the density signals of a pixel which is included in a gray region of a color space (Step S12). If the pixels are found to belong to the gray region, the gray region pixel detection part 241 provides a second histogram processing part 242 with a signal indicating this (hereinafter "gray signal").

In a gray region pixel detection method, for example, as to the inputted density signals $D_x$ of each pixel with respect to the respective color components, density differences Dd between the density values $D_B$, $D_G$ and $D_R$ are calculated and whether the largest absolute value |Dd| of the differences is equal to or smaller than a predetermined threshold value is judged. If the largest absolute value |Dd| is equal to or smaller than the predetermined threshold value, the pixel is found to belong to the gray region of the color space. As the absolute values |Dd| of the density differences Dd are small, the density signals $D_x$ with respect to G, B and R are closer to each other. Therefore, the pixel can be found to be a pixel in the gray region.

B-2-2. Specifying Average Density Value in Medium Density Region

Steps S13 to S17 are steps for finding an average density value of a gray region pixel in a predetermined density section of the intermediate density region. These steps approximately correspond to the process for finding the highlight side average density value $D_{HAx}$ and the shadow side average density value $D_{SAx}$ which have been described earlier in relation to the reference normalizing curve setting part 230 (flow chart of FIG. 4).

These steps are different from the process in that pixels to be subjected to density value averaging are not all pixels which are sent from the input part 220 but the pixels which are found by the gray region pixel detection part 241 to belong to the gray region (hereinafter "gray region pixels") and in that the density values are to be averaged is a predetermined medium density region.

The density signals $D_x$ from the input part 220 are also given to the second histogram processing part 242. The second histogram processing part 242, however, accepts the density signals $D_x$ only when receives the gray signal from the gray region pixel detection part 241.

Based on the density signals $D_x$ of the gray region pixels, the second histogram processing part 242 calculates an average density value $D_M$ ($D_M=(D_B+D_G+D_R)/3$) for each pixel. An average density frequency histogram generation part 242N generates a gray region average density frequency histogram for each color component in which a class indicating the range of the average density value $D_M$ is measured along a horizontal axis and the number of pixels NP is measured along a vertical axis (Step S13).

Cumulative density value table generation parts 242B, 242G and 242R accumulate the density values $D_B$, $D_G$ and $D_R$ for the respective color components B, G and R of the pixels which are included in each class of the average density frequency histograms. After performing such computation, with a class value $D_{Mi}$ (i=1 to n) measured along a horizontal axis and cumulative density values $\Sigma_{DB}$, $\Sigma_{DG}$ and $\Sigma_{DR}$ corresponding to the pixels which are included in the respective classes measured along vertical axes, gray region cumulative density value tables for the respective color components are created (Step S14). In reality, the steps S13 and S14 are performed parallel to each other.

The gray region average density frequency histograms and the gray region cumulative density value tables correspond to the average density frequency histograms (FIG. 6) and the cumulative density histograms (FIG. 7), respectively, which have been described in relation to generation of the reference normalizing curve C. Since the gray region average density frequency histograms and the gray region cumulative density value tables are approximately the same as the average density frequency histograms (FIG. 6) and the cumulative density histograms (FIG. 7) except for the density range along the horizontal axis, the frequency in each class along the vertical axis, the value of the cumulative density and etc., the gray region average density frequency histograms and the gray region cumulative density value tables are not illustrated.

Next, based on the gray region average density frequency histograms, a second cumulative processing part 243 creates a gray region cumulative relative frequency histogram in which the class value $D_{Mi}$ (i=1 to n) is measured along a horizontal axis and the relative frequency RN (%) of the pixels accumulated from the low density region is measured along a vertical axis (Step S15).

Figure 11:
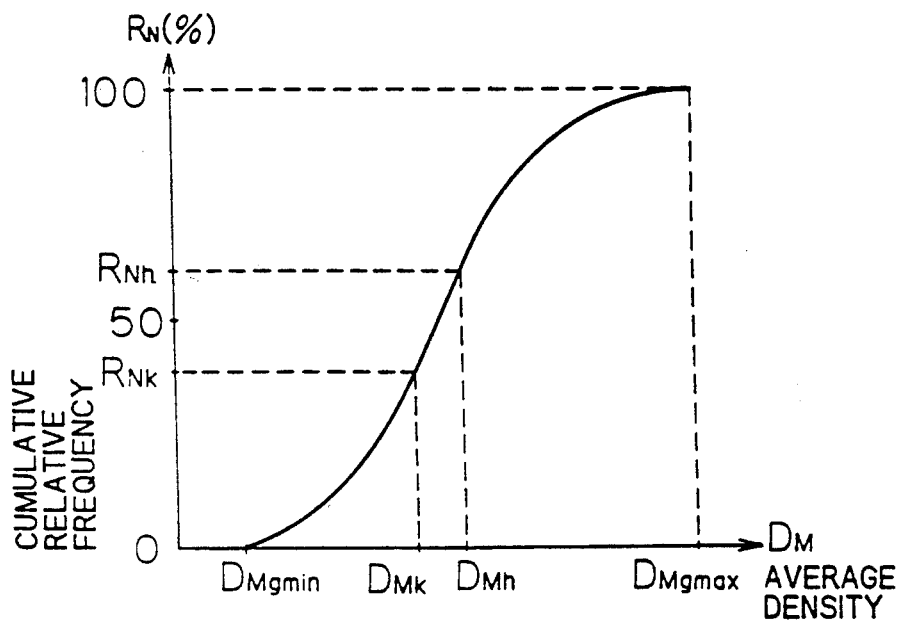
FIG. 11 is a view showing an example of a cumulative relative frequency histogram about gray region pixels.

An example of the gray region cumulative relative frequency histogram is shown in FIG. 11. The configuration of the histogram changes from 0% to 100% within a range between a minimum generated density $D_{Mgmin}$ and a maximum generated density $D_{Mgmax}$. On the premise that the class width is enough narrow likewise in FIG. 8, the gray region cumulative relative frequency histogram of FIG. 11 approximates a curve.

In a second section setting part 244, a predetermined range of a cumulative density appearance rate ($R_{Nk}$ to $R_{Nh}$) in the intermediate density region is set. Average density values $D_{Mk}$ and $D_{Mh}$ are calculated which respectively correspond to the cumulative density appearance rates $R_{Nk}$ and $R_{Nh}$ of the gray region cumulative relative frequency histogram of FIG. 11. A density section of the intermediate density region defined by the average density values $D_{Mk}$ and $D_{Mh}$ is then determined, and the information regarding the density section is given to a second average density computation part 245 (Step S16).

The values of the cumulative density appearance rates $R_{Nk}$ and $R_{Nh}$ are determined by analysis of a number of sample originals so as to statistically find an optimum range. The cumulative density appearance rates $R_{Nk}$ and $R_{Nh}$ are appropriate values above and under 50%, e.g., about 40% and 60%.

The second average density computation part 245 divides the total of the cumulative density values which belong to the density section which is designated by the second section setting part 244 with the total of the appearance frequencies of the pixels which belong to the same density section, to thereby calculate medium density region average density values $M_{dx}$ for the respective color components (Step S17).

Figure 12:
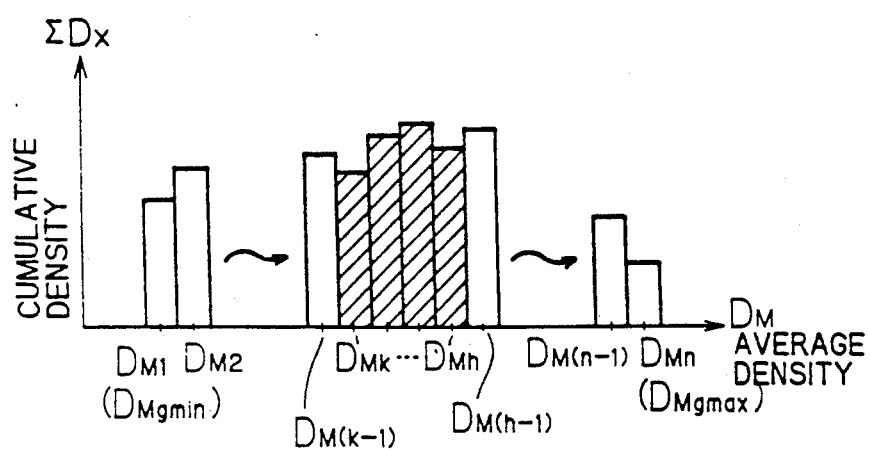
FIG. 12 is an explanatory diagram for finding an average density value in a specified density section of the intermediate density region.

In FIG. 12, the shadowed graph portions denote the cumulative density values which belong to the density section ($D_{Mk} \leq D_M \leq D_{Mh}$) of the gray region cumulative density value tables. The total $\Sigma(\Sigma_{Dx})M$ of the cumulative density values $\Sigma_{Dx}$ which are included in the shadowed graph portions is calculated. On the other hand, from the gray region average density frequency histograms, the total number $\Sigma_{NpM}$ of the pixels which exist in the density section is calculated. From Eq. 12 below, the average density value $M_{dx}$ in the intermediate density region is found.

$$M_{dx} = \Sigma(\Sigma_{Dx})M / \Sigma_{NpM} \tag{12}$$

B-2-3. Determining Correction Dummy Density Value

Next, correction dummy density values (a dummy highlight density value and a dummy shadow density value for correction) are determined.

First, an average value $M_{da}$ of the average density values $M_{dx}$ for the respective color components in the intermediate density region is calculated ($M_{da} = (M_{dB} + M_{dG} + M_{dR})/3$), and a difference $M_{Dx}$ between the average value $M_{da}$ and each average density value $M_{dx}$ is then calculated (that is, $M_{Dx} = M_{dx} - M_{da}$). The difference $M_{Dx}$ shows the eccentricity amount from the average density value $M_{dx}$ of each color component, and therefore, characterizes the amount of gray balance correction for each color in the intermediate density region.

Using these values as correction parameters and based on the highlight density value $D_{Hx}$ and the dummy shadow density value $D_{DSx}$ which are calculated by the reference normalizing curve setting part 230 as reference density values, a correction dummy highlight density value $C_{DHx}$ and a correction dummy shadow density value $C_{DSx}$ for each color component are established from Eqs. 13 and 14 below (Step S18).

$$C_{DHx} = D_{Hx} + K_H \cdot M_{Dx} \tag{13}$$

$$C_{DSx} = D_{DSx} + K_S \cdot M_{Dx} \tag{14}$$

where $K_H$ and $K_S$ are proportional constants which are determined by experience depending on the type and the like of the original film 1.

B-2-4. Setting Correction Function $G_x$

Using the correction dummy highlight density value $C_{DHx}$ and the correction dummy shadow density value $C_{DSx}$, a reference function correction part 248 corrects the nonlinear function $F_x$ which indicates the characteristics of the reference normalizing curve C which is established in (B-1) above to thereby yield a correction function $G_x$ which characterizes a correction normalizing curve $C_r$ in which the gray balance in the intermediate density region is corrected (Step S19).

While the nonlinear function $F_x$ is a function whose parameters are the density value D before normalization, the highlight density value $D_{Hx}$, the shadow density value $D_{Sx}$ and the dummy shadow density value $D_{DSx}$ (that is, the nonlinear function $F_x$ is expressed as $F_x(D, D_{Hx}, D_{Sx}, D_{DSx})$), the correction function $G_x$ is set as $G_x(D, D_{Hx}, D_{Sx}, C_{DHx}, C_{DSx})$ since in place of the dummy shadow density value $D_{DSx}$, the correction dummy shadow density value $C_{DSx}$ is used as a parameter, and the correction dummy highlight density value $C_{DHx}$ is also used as a parameter.

The correction function $G_x$ must be established so that the correction normalizing curve $C_{rx}$ for each color component which will be determined by the correction function $G_x$ satisfies the following conditions.

(a) Since the gray balance in the vicinity of the highlight density value and the shadow density value is already corrected using the reference normalizing curve C or needs not be corrected, on the normalization coordinates plane, the correction normalizing curve $C_{rx}$ passes through a first and a second points which are defined by these reference density values (First condition).

(b) In the intermediate density region, it is necessary to shift the reference normalizing curve C in a predetermined direction by the amount of correction of the gray balance. The amount of correction is dependent on $M_{Dx}$, i.e., the differences between the average density values $M_{dx}$ and its average value $M_{da}$ as described earlier, and therefore, the correction normalizing curve $C_{rx}$ runs close to or overlaps a straight line which passes through a third and a fourth points which are defined by the correction dummy shadow density value $C_{DSx}$ and the correction dummy highlight density value $C_{DHx}$ which are determined using the differences $M_{Dx}$ as parameters (Second condition).

An example of the correction function $G_x$ which satisfies these two conditions is expressed by Eq. 15 below.

$$G_x(D, D_{Hx}, D_{Sx}, C_{DHx}, C_{DSx}) = t \cdot F_x(D, D_{Hx}, D_{Sx}, C_{DSx}) + (1-t) \cdot F_x(D, C_{DHx}, D_{Sx}, C_{DSx}) \tag{15}$$

where t is a proportional constant (coefficient) which is expressed by Eq. 16 below.

$$t = \{(D - D_{Hx})/(D_{Sx} - D_{Hx}) - 1\}^2 \tag{16}$$

Figure 13:
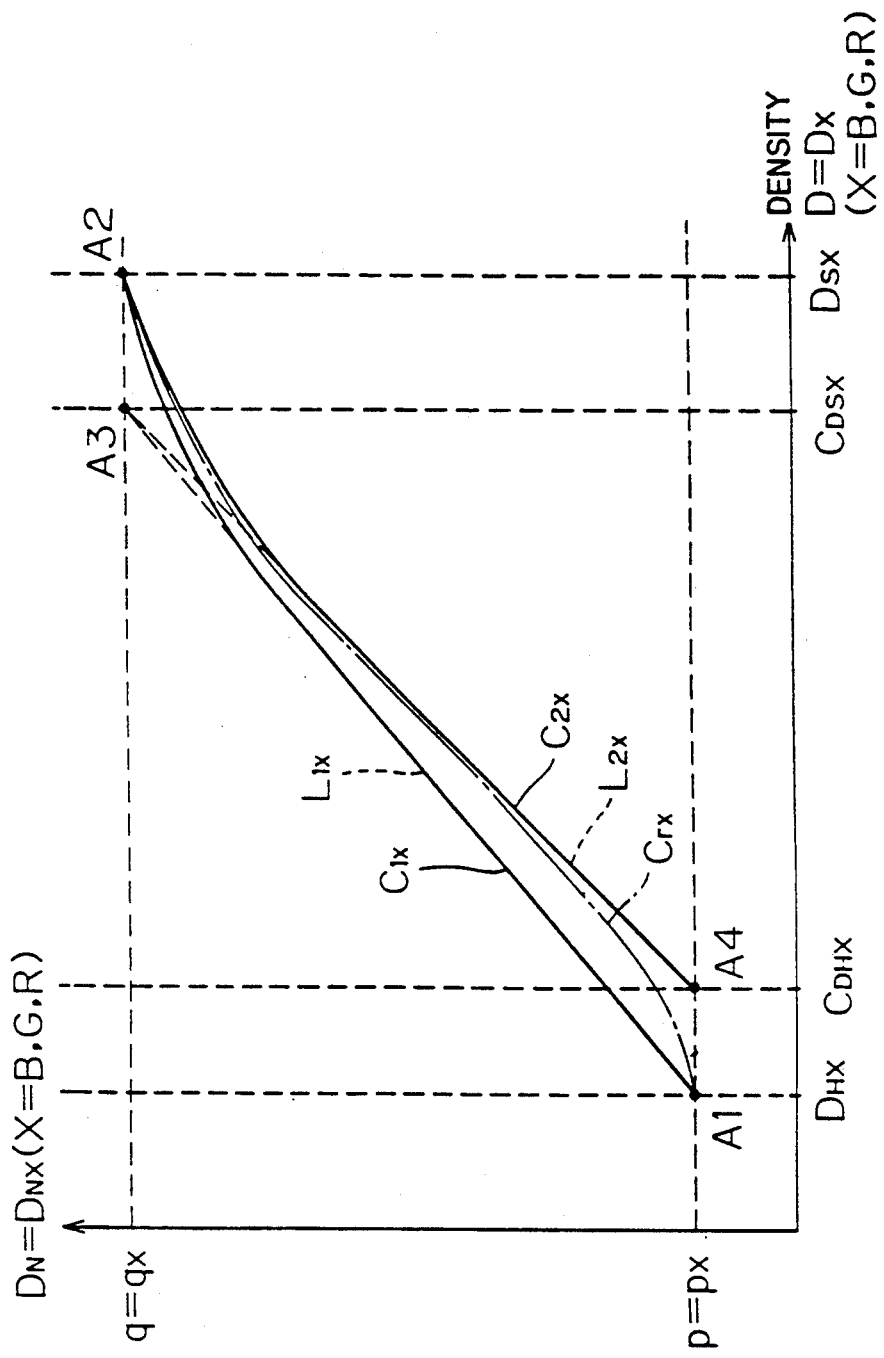
FIG. 13 is a view for explaining the nature of a correction normalizing curve.

That is, the correction function $G_x$ is expressed as a weighted mean of $G_{1x} = F_x(D, D_{Hx}, D_{Sx}, C_{DSx})$ and $G_{2x} = F_x(D, D_{Hx}, D_{Sx}, C_{DSx})$. Curves expressed by the functions $G_{1x}$ and $G_{2x}$ have configurations as those which are shown in FIG. 13 as the curves $C_{1x}$ and $C_{2x}$. The configurations of the curves shown in FIG. 13 are obtained when $D_{Hx} < C_{DHx}$ and $C_{DSx} < D_{Sx}$ in Eqs. 13 and 14.

The curve $C_{1x}$ is equal to the curve shown in FIG. 10 as it is amended by replacing the value $D_{DSx}$ with the value $C_{DSx}$, and therefore, coincides with a straight line L1x in the intermediate and the low density regions. The curve $C_{2x}$ is equal to the curve shown in FIG. 10 as it is amended by further replacing the value $D_{Hx}$ with the value $C_{DHx}$, and therefore, coincides with a straight line L2x in the intermediate and the low density regions. The straight line L1x runs from a first point A1 which is defined as a two-dimensional coordinates point ($D_{Hx}$, $p_x$) and a third point A3 which is defined as a two-dimensional coordinates point ($C_{DSx}$, $q_x$). The straight line L2x runs from a fourth point A4 which is defined as a two-dimensional coordinates point ($C_{DHx}$, $p_x$) and the third point A3.

Figure 15:
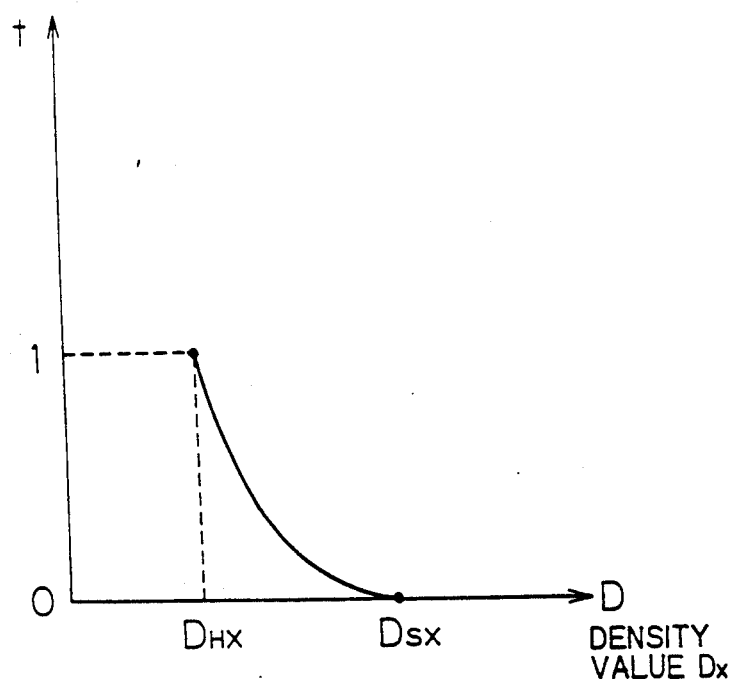
FIG. 15 is a graph showing a relation between a coefficient t and a density value D.

On the other hand, from Eq. 16, the coefficient t is expressed as a secondary function of the density value D, and hence, a graph as that shown in FIG. 15, for example, is obtainable.

Since the correction function $G_x$ is a weighted means of the functions $G_{1x}$ and $G_{2x}$ as described earlier and $0 \leq t \leq 1$ from the graph of FIG. 15, the correction normalizing curve $C_{rx}$ which is expressed by the correction function $G_x$ passes between the curve $C_{1x}$ and the curve $C_{2x}$.

The graph of FIG. 15 shows that $t=1$ when $D=D_{Hx}$. Hence, from Eq. 15, it is found that $G_x = G_{1x}$, thereby the correction normalizing curve $C_{rx}$ coinciding with the curve $C_{1x}$ and passing through the first point A1 ($D_{Hx}$, $q_x$) which is defined by the highlight density value $D_{Hx}$. On the other hand, $t=0$ when $D=D_{Sx}$, and therefore, from Eq. 15, $G_x = G_{2x}$. Hence, the correction normalizing curve $C_{rx}$ passes through the second point A2 ($D_{Sx}$, $p_x$) which is defined by the shadow density value $D_{Sx}$ in a similar manner.

Since the coefficient t is expressed as a secondary function of the density value D, as shown in FIG. 15, in the range $D_{Hx} < D_x < D_{Sx}$ of the intermediate density region, a change in the coefficient t becomes larger as the density value D becomes smaller and smaller as the density value D becomes larger.

Eq. 15 also shows that the function $G_{1x}$ is multiplied by the coefficient t while the function $G_{2x}$ is multiplied by the coefficient $(1-t)$. It then follows that from a change ratio of the coefficient t, the correction normalizing curve $C_{rx}$ becomes close to the curve $C_{2x}$ from the first point A1, and as the density value D becomes larger, the correction normalizing curve $C_{rx}$ runs approximately along the curve $C_{2x}$.

In the intermediate and the low density regions, the curve $C_{2x}$ coincides with the straight light L2x which runs from the fourth point A4 ($C_{DHx}$, $p_x$) which is defined by the correction dummy highlight density value $C_{DHx}$ and the third point A3 ($C_{DSx}$, $q_x$) which is defined by the correction dummy shadow density value $C_{DSx}$. Hence, the correction normalizing curve $C_{rx}$ becomes very close to or overlaps the straight light L2x (i.e., correction straight line) in the intermediate and the low density regions.

Figure 14:
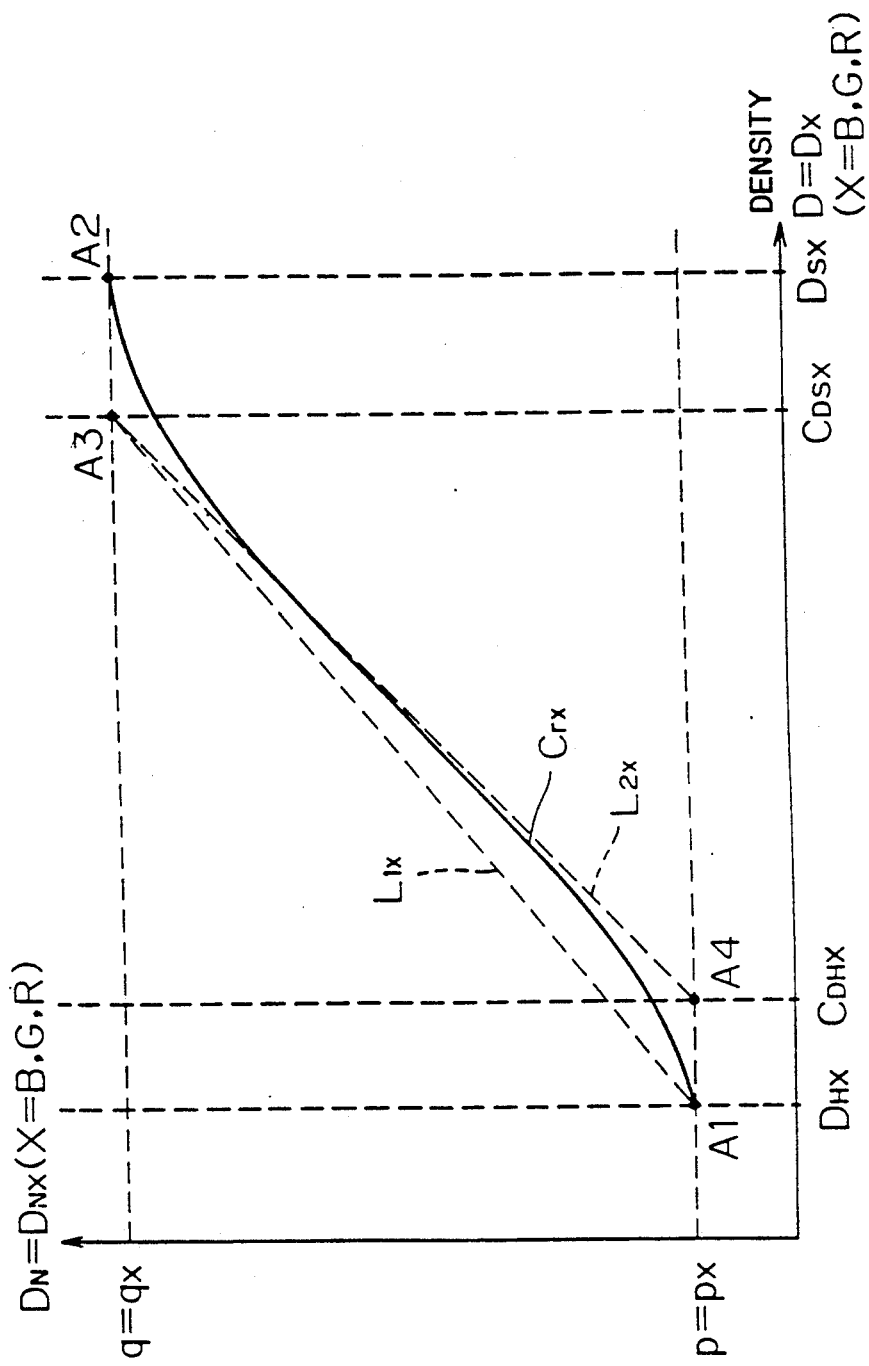
FIG. 14 is a graph showing an example of the correction normalizing curve.

FIG. 14 is a graph which shows the correction normalizing curve $C_{rx}$ thus generated. As shown in FIG. 14, the correction normalizing curve $C_{rx}$ runs very close to or overlaps the straight line L2x which passes through the first point A1 defined by the highlight density value $D_{Hx}$ and the second point A2 defined by the shadow density valve $D_{Sx}$ and through the third point A3 defined by the correction dummy shadow density value $C_{DSx}$ and the fourth point A4 defined by the correction dummy highlight density value $C_{DHx}$ in the intermediate and the low density regions. Thus, the correction normalizing curve $C_{rx}$ which is expressed by the correction function $G_x$ satisfies both the first condition and the second condition.

It is to be noted that the correction function $G_x$ defined by Eqs. 15 and 16 is merely an example. As far as satisfying the first condition and the second condition, any other appropriate function may be used as the correction function.

Once the correction function $G_x$ is specified for each color component, numeric data which express the conversion characteristics of the correction function $G_x$, i.e., data in which the curve $C_{rx}$ of FIG. 14 is expressed by numerical values, are created and loaded in the LUT 202 of FIG. 1 for each color component.

Following this, as described earlier, based on the data loaded in the LUT 202, the density signals $D_x$ of the respective pixels are normalized during scanning.

A comparison part 247 of the intermediate density region correction part 240 of FIG. 2 receives from the first cumulative processing part 232 and the second cumulative processing part 243 the total number of pixels of an inputted image-to-be-processed and the total number of pixels which are included in the gray region of the image-to-be-processed, respectively. If the ratio of the number of the pixels of the gray region to the total number of the pixels is equal to or smaller than a certain value (e.g., 10%), that is, if the original is occupied largely by primitive colors, since a demand for correction of the gray balance is small, the comparison part 247 automatically instructs the reference function correction part 248 not to perform correction of the gray balance.

C. Modifications (1) Correction of the reference normalizing curve C completes in the manner above. However, in the normalizing curve generation part 210 according to this embodiment shown in FIG. 2, since the reference normalizing curve C is created and thereafter corrected if correction is necessary, it is also possible that information about an already available normalizing curve is inputted from outside, corrected in the intermediate density region correction part 240 and used.

If the already available normalizing curve does not have the dummy shadow density value as the reference value, Eq. 14 needs be changed into Eq. 17 below.

$$C_{DSx} = D_{Sx} + K_{S1} \cdot M_{Dx} \qquad (17)$$

In other words, where a proportional constant is $K_{S1}$, it is possible to determine the correction dummy shadow density value $C_{DSx}$ using the shadow density value of the already available normalizing curve as the reference value.

(2) In addition, it is possible that the same circuit is used commonly as the reference normalizing curve setting part 230 and the intermediate density region correction part 240 and that the function $G_x$ which satisfies both the first condition and the second condition is directly generated without creating the reference normalizing curve C.

Further, in the process color scanner 100 of FIG. 1, a portion or all of the normalizing curve generation part 210 may be realized by the CPU 17 and the memory 18 of the information processing apparatus 16.

(3) Although normalization is performed as a digital process using the LUT 202 in the embodiment above, normalization may be performed as an analog process using a function generator.

(4) It is desirable to determine the highlight density value $D_{Hx}$ and the shadow density value $D_{Sx}$ by a statistical method using a histogram and the like as is done in the embodiment above. However, if there are a highlight point and a shadow point in the original film 1, the color densities of the highlight point and the shadow point which are measured by an operator may be used as the highlight density value $D_{Hx}$ and the shadow density value $D_{Sx}$.

(5) An encountered application of the present invention is not limited to a process color scanner. Rather, the present invention is applicable to any other image processing apparatuses which performs color separation and other operations on the image of an original.

While the invention has been described in detail, the foregoing description is in all aspects illustrative and not restrictive. It is understood that numerous other modifications and variations can be devised without departing from the scope of the invention.

I claim:

1. A method of converting original color image signals $D_x$ into converted color image signals $D_{Nx}$ suitable for image processing in a color image processor, wherein said original color image signals $D_x$ represent optical densities of an original color image for each pixel and for respective color components, said method comprising the steps of:

(a) specifying gray pixels on said original color image;

(b) averaging said original color image signals $D_x$ for respective color components in each gray pixel to obtain an average signal $D_M$ for each gray pixel;

(c) dividing a range of said average signal $D_M$ into a plurality of classes $D_{Mi}$;

(d) classifying said average signal $D_M$ representative of said gray pixels into said plurality of classes $D_{Mi}$;

(e) accumulating said original color signals $D_x$ for each color component in each class $D_{Mi}$ of said average signal $D_M$ to obtain accumulated density signal $\Sigma D_x$ for each color component;

(f) generating a sum signal $\Sigma(\Sigma D_x)_M$ representative of a sum of said accumulated density signal $\Sigma D_x$ for each color component within a predetermined intermediate density section $D_{Mk} \leq D_M \leq D_{Mh}$;

(g) counting number $\Sigma N_{pn}$ of pixels whose original color signals $D_x$ are included in said intermediate density section $D_{Mk} \leq D_M \leq D_{Mh}$;

(h) dividing said sum signal $\Sigma(\Sigma D_x)_M$ for each color component by said number $\Sigma N_{pn}$ of pixels to obtain accumulated average signals $M_{dx}$ for respective color components;

(i) averaging said accumulated average signals $M_{dx}$ for respective color components to obtain a gray average signal $M_{da}$;

(j) generating difference signals $M_{Dx}=(M_{dx}-M_{da})$ between said accumulated average signals $M_{dx}$ and said gray average signal $M_{da}$;

(k) modifying a predetermined reference signal-conversion characteristic C as a function of said difference signals $M_{Dx}=(M_{dx}-M_{da})$ to obtain modified signal-conversion characteristics $C_{rx}$ for respective color components; and (l) converting said original color image signals $D_x$ by said modified signal-conversion characteristics $C_{rx}$ to obtain said converted color image signals $D_{Nx}$ for respective color components.

2. The method of claim 1, wherein the step (a) comprises the steps of:

(a-1) generating color-difference signals $D_d$ representative of a difference among said original color image signals $D_x$ for respective color components in each pixel; and (a-2) comparing said color-difference signals $D_d$ with a predetermined threshold signal in each pixel to specify said grey pixels.

3. The method of claim 2, wherein the step (a) further comprises the steps of:

(a-3) determining a ratio of number of said gray pixels to total number of pixels on said original color image;

(a-4) comparing said ratio with a predetermined threshold ratio;

said step (k) comprising the step of:

(k-1) modifying said predetermined reference signal-conversion characteristic C as a function of said difference signals $M_{Dx}=(M_{dx}-M_{da})$ only when said total number of said gray pixels is larger than said threshold pixel number.

4. The method of claim 3, wherein said step (k) further comprises the steps of:

(k-2) determining dummy highlight points $C_{DHx}$ and dummy shadow points $C_{DSx}$ of said original color image for respective color components as a function of said difference signals $M_{Dx}=(M_{dx}-M_{da})$;

(k-3) determining linear signal-conversion characteristics $L_{2x}$ for respective color components defined on a coordinate plane and connecting;

first points $(C_{DHx}, p_x)$ defined by said dummy highlight densities $C_{DHx}$ and said first predetermined signal values $p_x$, and second points $(C_{DSx}, q_x)$ defined by said dummy shadow densities $C_{DSx}$ and said second predetermined signal values $q_x$, and (k-4) modifying said reference signal-conversion characteristic C so as to coincide with or approximate to said linear signal-conversion characteristics $L_{2x}$ in density sections between said dummy highlights densities $C_{DHx}$ and said dummy shadow densities $C_{DSx}$ to obtain said modified signal-conversion characteristics $C_{rx}$ for respective color components, respectively.

5. The method of claim 4, wherein said step (f) comprises the step of:

(f-1) determining said intermediate density section $D_{MK} \leq D_M \leq D_{Mh}$ as a function of statistical distributions of said average signals $D_M$.

6. A method of converting original color image signals $D_x$ into converted color image signals $D_{Nx}$ suitable for image processing in a color image processor, wherein said original color image signals $D_x$ represent optical densities of an original color image for each pixel and for respective color components, said method comprising the steps of:

(a) determining a highlight density $D_{Hx}$ and a shadow density $D_{Sx}$ in a possible density range of said original color image signals $D_x$;

(b) determining dummy highlight densities $C_{DHx}$ and dummy shadow densities $C_{DSx}$ for respective color components in said possible density range of said original color image signals $D_x$;

(c) determining signal-conversion characteristics $C_{rx}$ for respective color components representative of signal-conversion curves defined on a coordinate plane satisfying the conditions that;

l) said signal-conversion curves pass through;

first points $(D_{Hx}, p_x)$ defined by said highlight densities $D_{Hx}$ and first predetermined signal values $p_x$, and second points ($D_{Sx}$, $q_x$) defined by said shadow densities $D_{Sx}$ and second predetermined signal values $q_x$, and II) part of said signal-conversion curves defined for a predetermined intermediate density section coincide with or approximate to lines connecting;

third points ($C_{DHx}$, $p_x$) defined by said dummy highlight densities $C_{DHx}$ and said first predetermined signal values $p_x$, and fourth points ($C_{DSx}$, $q_x$) defined by said dummy shadow densities $C_{DSx}$ and said second predetermined signal values $q_x$, and (d) converting said original color image signals $D_x$ by said signal-conversion characteristics $C_{rx}$ to obtain said converted color image signals $D_{Nx}$ for respective color components.

7. The method of claim 6, wherein the step (b) comprises the step of:

(b-1) determining said dummy highlight densities $C_{DHx}$ and said dummy shadow densities $C_{DSx}$ as a function of a statistical distribution of gray pixels on said original color image.

8. An apparatus for converting original color image signals $D_x$ into converted color image signals $D_{Nx}$ suitable for image processing in a color image processor, wherein said original color image signals $D_x$ represent optical densities of an original color image for each pixel and for respective color components, said apparatus comprising:

(a) means for specifying gray pixels on said original color image;

(b) means for averaging said original color image signals $D_x$ for respective color components in each gray pixel to obtain an average signal $D_M$ for each gray pixel;

(c) means for dividing a range of said average signal $D_M$ into a plurality of classes $D_{Mi}$;

(d) means for classifying said average signal $D_M$ representative of said gray pixels into said plurality of classes $D_{Mi}$;

(e) means for accumulating said original color signals $D_x$ for each color component in each class $D_{Mi}$ of said average signal $D_M$ to obtain accumulated density signal $\Sigma D_x$ for each color component;

(f) means for generating a sum signal $\Sigma(\Sigma D_x)_M$ representative of a sum of said accumulated density signal $\Sigma D_x$ for each color component within a predetermined intermediate density section $D_{Mk} \leq D_M \leq D_{Mh}$;

(g) means for counting number $\Sigma N_{pn}$ of pixels whose original color signals $D_x$ are included in said intermediate density section $D_{Mk} \leq D_M \leq D_{Mh}$, (h) means for dividing said sum signal $\Sigma(\Sigma D_x)_M$ for each color component by said number $\Sigma N_{pn}$ of pixels to obtain accumulated average signals $M_{dx}$ for respective color components;

(i) means for averaging said accumulated average signals $M_{dx}$ for respective color components to obtain a gray average signal $M_{da}$;

(j) means for generating difference signals $M_{Dx}=(M_{dx}-M_{da})$ between said accumulated average signals $M_{dx}$ and said gray average signal $M_{da}$;

(k) means for modifying a predetermined reference signal-conversion characteristic C as a function of said difference signals $M_{Dx}=(M_{dx}-M_{da})$ to obtain modified signal-conversion characteristics $C_{rx}$ for respective color components; and (l) means for converting said original color image signals $D_x$ by said modified signal-conversion characteristics $C_{rx}$ to obtain said converted color image signals $D_{Nx}$ for respective color components.

9. The apparatus of claim 8, wherein the means (a) comprises:

(a-1) means for generating color-difference signals $D_d$ representative of a difference among said original color image signals $D_x$ for respective color components in each pixel; and (a-2) means for comparing said color-difference signals $D_d$ with a predetermined threshold signal in each pixel to specify said gray pixels.

10. The apparatus of claim 9, wherein the means (a) further comprises:

(a-3) means for determining a ratio of number of said gray pixels to total number of pixels on said original color image;

(a-4) means for comparing said ratio with a predetermined threshold ratio;

said means (k) comprising:

(k-1) means for modifying said predetermined reference signal-conversion characteristic C as a function of said difference signals $M_{Dx}=(M_{dx}-M_{da})$ only when said total number of said gray pixels is larger than said threshold pixel number.

11. The apparatus of claim 10, wherein said means (k) further comprises:

(k-2) means for determining dummy highlight points $C_{DHx}$ and dummy shadow points $C_{DSx}$ of said original color image for respective color components as a function of said difference signals $M_{Dx}=(M_{dx}-M_{da})$;

(k-3) means for determining linear signal-conversion characteristics $L_{2x}$ for respective color components defined on a coordinate plane and connecting;

first points ($C_{DHx}$, $p_x$) defined by said dummy highlight densities $C_{DHx}$ and said first predetermined signal values $p_x$, and second points ($C_{DSx}$, $q_x$) defined by said dummy shadow densities $C_{DSx}$ and said second predetermined signal values $q_x$, and (k-4) means for modifying said reference signal-conversion characteristic C so as to coincide with or approximate to said linear signal-conversion characteristics $L_{2x}$ in density sections between said dummy highlight densities $C_{DHx}$ and said dummy shadow densities $C_{DSx}$ to obtain said modified signal-conversion characteristics $C_{rx}$ for respective color components, respectively.

12. The apparatus of claim 11, wherein said means (f) comprises:

(f-1) means for determining said intermediate density section $D_{Mk} \leq D_M \leq D_{Mh}$ as a function of statistical distributions of said average signals $D_M$.

13. A apparatus of converting original color image signals $D_x$ into converted color image signals $D_{Nx}$ suitable for image processing in a color image processor, wherein said original color image signals $D_x$ represent optical densities of an original color image for each pixel and for respective color components, said apparatus comprising:

(a) means for determining a highlight density $D_{Hx}$ and a shadow density $DS_x$ in a possible density range of said original color image signals $D_x$;

(b) means for determining dummy highlight densities $C_{DHx}$ and dummy shadow densities $C_{DSx}$ for respective color components in said possible density range of said original color image signals $D_x$;

(c) means for determining signal-conversion characteristics $C_{rx}$ for respective color components representative of signal-conversion curves defined on a coordinate plane satisfying the conditions that;

I) said signal-conversion curves pass through;

first points ($D_{Hx}$, $p_x$) defined by said highlight densities $D_{Hx}$ and first predetermined signal values $p_x$, and second points ($D_{sx}$, $q_x$) defined by said shadow densities $D_{Sx}$ and second predetermined signal values $q_x$, and II) part of said signal-conversion curves defined for a predetermined intermediate density section coincide with or approximate to lines connecting;

third points ($C_{DHx}$, $p_x$) defined by said dummy highlight densities $C_{DHx}$ and said first predetermined signal values $p_x$, and fourth points ($C_{DSx}$, $q_x$) defined by said dummy shadow densities $C_{DSx}$ and said second predetermined signal values $q_x$, and (d) means for converting said original color image signals $D_x$ by said signal-conversion characteristics $C_{rx}$ to obtain said converted color image signals $D_{Nx}$ for respective color components.

14. The apparatus of claim 13, wherein the means (b) comprises:

(b-1) means for determining said dummy highlight densities $C_{DHx}$ and said dummy shadow densities $C_{DSx}$ as a function of a statistical distribution of gray pixels on said original color image.

* * * * *